(12) United States Patent
Goken et al.

(10) Patent No.: US 11,240,764 B2
(45) Date of Patent: Feb. 1, 2022

(54) METHOD FOR IMPROVING THE PERFORMANCE OF AN UPLINK NON-ORTHOGONAL MULTIPLE ACCESS METHOD

(71) Applicant: ASELSAN ELEKTRONIK SANAYI VE TICARET ANONIM SIRKETI, Ankara (TR)

(72) Inventors: Cagri Goken, Ankara (TR); Onur Dizdar, Ankara (TR); Alptekin Yilmaz, Ankara (TR)

(73) Assignee: ASELSAN ELEKTRONIK SANAYI VE TICARET ANONIM SIRKETI, Ankara (TR)

(*) Notice: Subject to any disclaimer, the term of this patent is extended or adjusted under 35 U.S.C. 154(b) by 65 days.

(21) Appl. No.: 16/879,778

(22) Filed: May 21, 2020

(65) Prior Publication Data
US 2021/0314878 A1 Oct. 7, 2021

(30) Foreign Application Priority Data
Apr. 7, 2020 (TR) .................................. 2020/05532

(51) Int. Cl.
*H04L 25/02* (2006.01)
*H04W 52/24* (2009.01)
(Continued)

(52) U.S. Cl.
CPC ....... *H04W 52/243* (2013.01); *H04L 25/0204* (2013.01); *H04L 25/0256* (2013.01);
(Continued)

(58) Field of Classification Search
None
See application file for complete search history.

(56) References Cited

U.S. PATENT DOCUMENTS 10,498,558 B1\* 12/2019 Pajovic .................. H04B 1/707
2019/0029031 A1\* 1/2019 Kumar .............. H04W 28/0278
(Continued)

FOREIGN PATENT DOCUMENTS

WO 2016072677 A1 5/2016

*Primary Examiner* — Jenkey Van
(74) *Attorney, Agent, or Firm* — Bayramoglu Law Offices LLC (57) ABSTRACT

A method for improving performance of an uplink non-orthogonal multiple access system under imperfect received user power control. The method is based on a plurality of user-specific transmitter filters assigned to a plurality of users. At a transmitter of each user, a signal to be transmitted according to the uplink non-orthogonal multiple access (NOMA) method is filtered by a unique filter assigned to a corresponding user, and then a baseband-to-RF processing is performed onto a symbol sequence to generate a transmitted signal. Each user transmits their respective signal using a same time-frequency resource, and receiver receives a superimposed signal which is transmitted through a plurality of respective uplink channels under imperfect received power control. An RF-to-baseband conversion is applied onto a received superimposed signal. Then, a receiver signal detection module; including an interference-cancellation multi-user detector detects each user data using knowledge of a plurality of transmitter filters of each user.

4 Claims, 5 Drawing Sheets

(51) Int. Cl.
*H04W 52/14* (2009.01)
*H04W 24/00* (2009.01)
*H04W 74/08* (2009.01)

(52) U.S. Cl.
CPC ......... *H04W 24/00* (2013.01); *H04W 52/146* (2013.01); *H04W 74/0833* (2013.01)

(56) References Cited

U.S. PATENT DOCUMENTS

2020/0044797 A1* 2/2020 Guo .................... H04W 72/085
2021/0007095 A1* 1/2021 Eldessoki ........... H04L 27/2627

\* cited by examiner

METHOD FOR IMPROVING THE PERFORMANCE OF AN UPLINK NON-ORTHOGONAL MULTIPLE ACCESS METHOD

CROSS REFERENCES TO THE RELATED APPLICATIONS

This application is based upon and claims priority to Turkish Patent Application No. 2020/05532, filed on Apr. 7, 2020, the entire contents of which are incorporated herein by reference.

TECHNICAL FIELD

The present invention relates to the field of communication and particularly to uplink multi-user communication methods.

BACKGROUND

Uplink multi-user access can be carried out through different multiple access schemes. Specifically, frequency division multiple access (FDMA), time division multiple access (TDMA), code domain multiple access (CDMA) and orthogonal frequency division multiple access (OFDMA) have been utilized in various communication systems. Uplink multiple access methods may be orthogonal or non-orthogonal. In orthogonal multiple access (OMA) schemes, the users can share the resources orthogonally in frequency, time or code domain whereas non-orthogonal multiple access (NOMA) schemes are based on the idea that multiple users share the same resource block (e.g. time slot, subcarrier group) via non-orthogonal resource allocation.

Current modern wireless communication systems target to ensure higher spectral density, lower latency, and increased connectivity density compared to previous ones. OMA schemes may not be sufficient to support some of these demands, as the number of orthogonal resources, e.g., frequency, time, etc. may limit the number of supported users in the network. The main motivation behind non-orthogonal multiple access (NOMA) is to increase system capacity by utilizing the resources more efficiently and/or provide enhanced connectivity. In particular, NOMA schemes are considered for service scenarios such as Internet of Things (IoT) and massive Machine Type Communications (mMTC) which require the connection of massive number of low-cost and energy efficient devices sending sparse and small packets in the uplink communications, possibly in a grant-free manner.

Generally speaking, uplink NOMA is a technique which allows a central unit, such as a base station, to communicate with more users than the number of orthogonal resources in the uplink scenario. Many novel uplink NOMA methods have been proposed, some of which are Sparse Coded Multiple Access (SCMA), Pattern Division Multiple Access (PDMA), Multi-User Shared Access (MUSA), Polar Coding-Based Non-Orthogonal Multiple Access (PC-NOMA) and Interleave Division Multiple Access (IDMA). The schemes share the common idea to superpose different user signals in the same orthogonal resources in a controlled manner so that they can be recovered utilizing advanced receiver structures. In order to limit the multi-user interference and distinguish between users, user specific signatures or patterns are considered. The abovementioned NOMA methods may be categorized based on which type of signatures are used, which can be power-domain, codebook domain or in modulation and symbol level processing including spreading, repetition, and interleaving.

The performances of uplink NOMA methods depend on the disparity in the received user powers. Severe degradation in the performance of uplink NOMA systems occur especially for the cases in which the channel conditions of the multiplexed users are not significantly different. In the studies for user and power allocation methods for uplink NOMA, the channel conditions of the multiplexed users are assumed to be known precisely. However, such an assumption is difficult to satisfy in practical scenarios. Furthermore, in communications scenarios such as satellite communications, achieving distinct received power levels is difficult since using significant back-off levels for accurate power control may not be possible due to large communication distances and limited variations between the user channels. Therefore, the achievable received power disparity can be small, which results in performance degradation in uplink NOMA methods.

Therefore, there is a need in the art for a performance improvement method for uplink NOMA systems with imperfect received power control which can occur due to reasons, such as, large overhead of channel state information feedback, lack of a centralized unit, rapidly changing environments or overall system complexity.

The application numbered WO2016072677A1 discloses a multi-carrier system using a non-orthogonal transmission signal and in particular, to a method and a device for transmitting and receiving a signal by using a high-order orthogonal amplitude modulation in a multi-carrier system using a non-orthogonal transmission signal. The system comprises a transmission filter for transmitting and a reception filter applied to the received data signal to improve signal-to-interference ratio (SIR) performance of a filter-bank multicarrier system in high order modulation situations. This document considers non-orthogonal multicarrier transmission system for a single user and does not consider an uplink NOMA method. Therefore, this document does not disclose a method for improving the performance of an uplink NOMA method with an imperfect received power control, wherein the received powers of the multiplexed users are not distinct.

SUMMARY

The present invention provides a method for improving the performance of an uplink NOMA method under imperfect received user power control. The performance improvement method is based on the user-specific transmitter filters assigned to users. At the transmitter of each user, the signal to be transmitted according to an uplink NOMA method is filtered by a unique filter assigned to corresponding user, and then baseband-to-RF processing is performed onto the symbol sequence to generate the transmitted signal. Each user transmits their respective signal using the same time-frequency resource, and receiver receives the superimposed signal which is transmitted through respective uplink channels under imperfect received power control. An RF-to-baseband conversion is applied onto the received signal. Then, the receiver signal detection module; including interference-cancellation multi-user detector detects each user data using the knowledge of the transmitter filters of each user.

DETAILED DESCRIPTION OF THE EMBODIMENTS

Hereinafter, the detailed descriptions of the embodiments of the present disclosure will be given with accompanying drawings.

Figure 1:
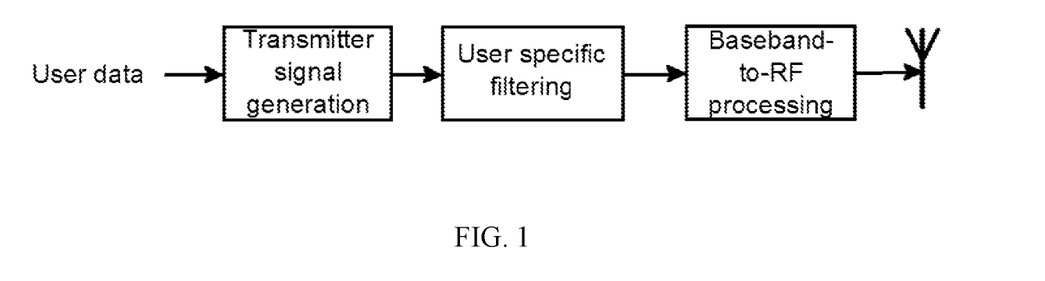
FIG. 1 shows the procedure to generate the transmitted signal of each user at the transmitter.

FIG. 1 shows the main embodiment that provides a description of the method for improving the performance of an uplink NOMA method under imperfect received user power control based on the transmit filters assigned to users and the procedure to generate the transmitted signal of each user at the transmitter. Herein, the user data is processed and the signal to be transmitted is generated according to an uplink NOMA method. User-specific filtering is performed on the signal to be transmitted and then, baseband-to-RF processing is performed onto the filtered signal to generate the transmitted signal.

Figure 2:
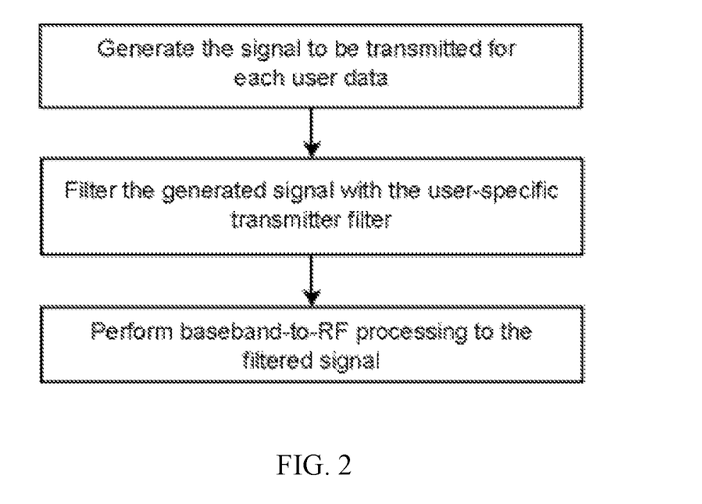
FIG. 2 is the flow-chart of the operations performed at the transmitter side of each user.

The flow-chart of the operations performed at the transmitter side of each user is given in FIG. 2. In first step of the present disclosure, the signal to be transmitted is generated by processing the user data according to an uplink NOMA method. In one example of this embodiment, user data processing to generate the signal to be transmitted according to an uplink NOMA method includes the operation appending the information bits coming from information source in the transmitter and the CRC-bits, which are generated according to a CRC-generating polynomial and the user data bits. CRC-generating polynomial may be a user-specific polynomial, or it may be a predefined polynomial to be used by all users.

In one example, user data processing to generate the signal to be transmitted according to an uplink NOMA method includes the operation of error-correction coding. Herein, the error-correction encoding is performed using one of the error-correction codes including but not limited to Low Density Parity Check (LDPC) codes, Turbo codes, Polar codes, Convolutional codes, Reed-Solomon codes, Reed-Muller codes, Staircase codes.

In another example, user data processing to generate the signal to be transmitted according to an uplink NOMA method includes the operation of interleaving. Herein, the interleaving is applied to the coded bits using a preset interleaver, and interleaver may be a user-specific interleaver or it may be a predefined interleaver to be used by all users.

Yet another example, user data processing to generate the signal to be transmitted according to an uplink NOMA method includes the operation of scrambling. Herein, the scrambling operation is applied to the coded bits using a preset pseudo-random scrambling sequence, and scrambling sequence may be a user-specific sequence, or it may be a predefined sequence to be used by all users.

In one example, user data processing to generate the signal to be transmitted according to an uplink NOMA method includes the operation of modulation. Herein, the user bits are modulated using one of the modulation schemes including but not limited to $\pi/2$ BPSK, BPSK, QPSK, $\pi/4$ QPSK, 8PSK, 16-APSK, 32-APSK, 16-QAM, 64-QAM, 256-QAM, 1024-QAM.

In one example, user data processing to generate the signal to be transmitted according to an uplink NOMA method includes the operations for the signal generation for single/multiple transmit antenna uplink transmission using a single-carrier modulation including but not limited to Discrete Fourier Transform-Spread-OFDM (DFT-S-OFDM). Moreover, this step includes the operations for the signal generation for single/multiple transmit antenna uplink transmission using an orthogonal multi-carrier modulation including but not limited to Cyclic-Prefix OFDM (CP-OFDM). In another example, this step includes the signal generation for single/multiple antenna uplink transmission using a non-orthogonal multi-carrier modulation including but not limited to filtered OFDM (f-OFDM), filterbank multicarrier (FBMC), universal-filtered multicarrier (UFMC).

In one example, user data processing to generate the signal to be transmitted according to an uplink NOMA method includes the operations for other uplink NOMA processing operations including but not limited to CDMA, SCMA, MUSA, IDMA, PDMA, PC-NOMA.

In second step of the present disclosure, user-specific filtering is performed on the user signal to be transmitted to improve the performance of the uplink NOMA method under imperfect received power control. The performance improvement is achieved due to separation of user signals in the frequency spectrum. This is due to the fact that, in the lack of filtering, the received power of different users is not distinct under imperfect received power control. The performance degradation occurs in an uplink NOMA method in such situations. Therefore, the main goal is to provide different portions of the signal bandwidth carrying the data symbols have different power gains for the considered users using unique, user-specific filters to facilitate the detection of superimposed user signals with proper signal processing at the receiver.

In one example, user-specific filtering further comprises using filters in the digital domain. Herein, the filters are selected among a preset generated filter table according to an index information sent from the receiver. In one example, the filters in the table are randomly generated according to a preset statistical model. In another example, the filters in the table are optimized filters using a specific performance criterion, including but not limited to minimum-mean square error, block error rate, signal-to-interference noise ratio at the receiver.

In one example, user-specific filtering further comprises using filters in the digital domain. Herein, the filters are selected among a preset generated filter table according to an index information generated using a preset pseudorandom sequence. In one example, the filters in the table are randomly generated according to a preset statistical model. In another example, the filters in the table are optimized filters using a specific performance criterion, including but not limited to minimum-mean square error, block error rate, signal-to-interference noise ratio at the receiver.

In one example, user-specific filtering further comprises using filters in the digital domain. Herein, the filters are randomly generated according to a preset statistical model at the time of transmission and they are not necessarily stored in a filter table.

In one example, user-specific filtering includes using filters in the analog domain.

In third step of the present disclosure, baseband-to-RF processing is performed onto the filtered signal.

Figure 3:
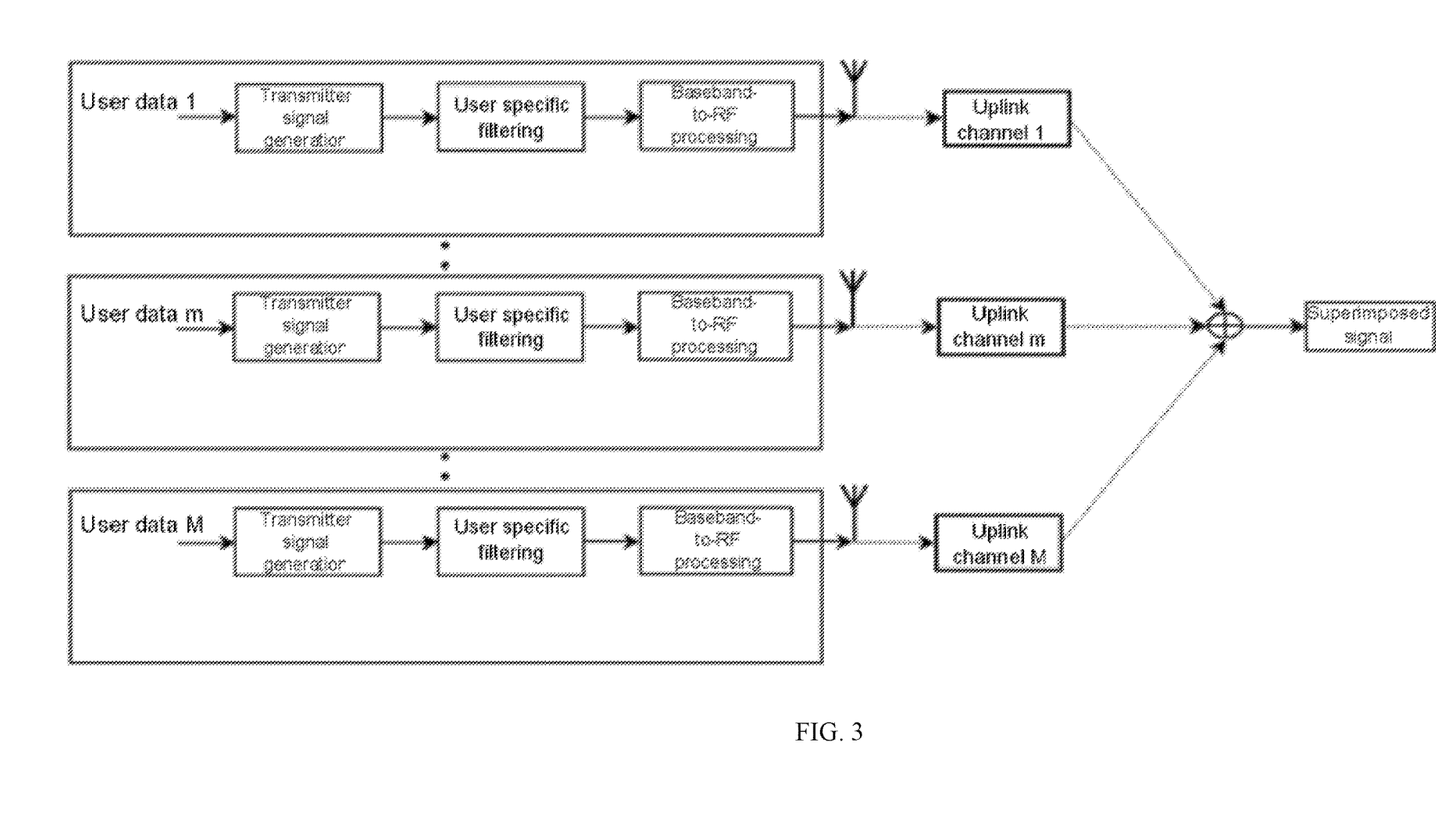
FIG. 3 shows transmission of respective signal of each user using the same time-frequency resource and reception the superposed signal transmitted through respective uplink channels.

As given in FIG. 3, in fourth step of the present disclosure, each user transmits their respective baseband-to-RF processed signal using the same time-frequency resource to a receiver. As the signal of all users are transmitted in the same resource blocks, the receiver unit identifies different user data performing signal detection on the baseband signal with multiuser detector using the knowledge of the transmit filters. This knowledge might be the perfect user-specific transmit filter information assigned to each user or an estimate of the combined effect of user-specific transmit filters and the physical radio channel of the corresponding users. The signals of each user can be distinguished in the spectral domain despite multi-user interference by using unique transmit filters at each transmitter. Consequently, more users than available orthogonal resource blocks can transmit their data to the receiver and the system can operate under overload improving the system capacity.

Figure 4:
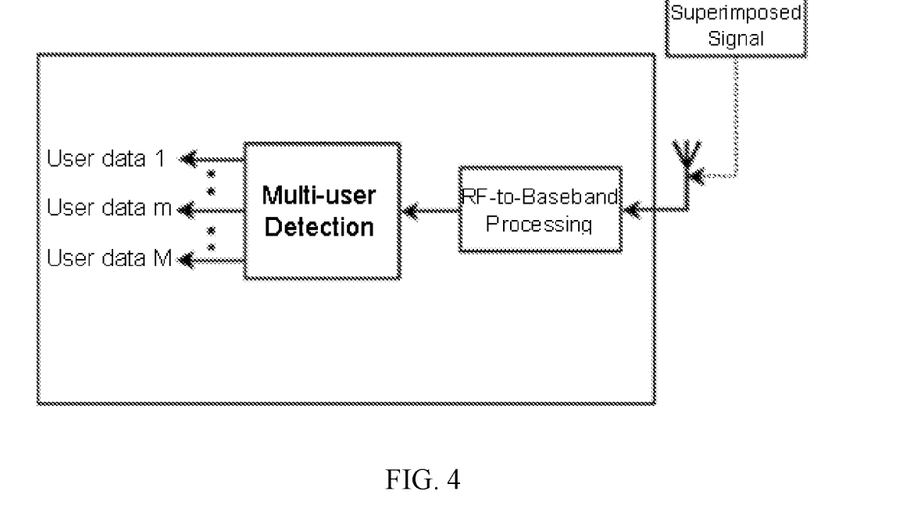
FIG. 4 shows the procedure to receive and process the received signal at the receiver.

FIG. 4 shows the main embodiment that provides a description of the method for improving the performance of an uplink NOMA method under imperfect received user power control based on the transmit filters assigned to users and the procedure to receive and process the received signal at the receiver.

A description of a receiver side of a multiple access method for uplink communication based on user-specific transmit filtering is also provided. The procedure to receive and process the received signal at the receiver is given in FIG. 4. Herein, the receiver receives the superimposed signal of M users transmitted through M uplink radio channels under imperfect received power control. An RF-to-baseband conversion is applied onto the received superimposed signal. Then, the detection of each user data is performed using a multi-user detector with the knowledge of the user-specific transmit filters. This knowledge might be the perfect user-specific transmit filter information assigned to each user or an estimate of the combined effect of user-specific transmit filters and the physical radio channel of the corresponding users.

Figure 5:
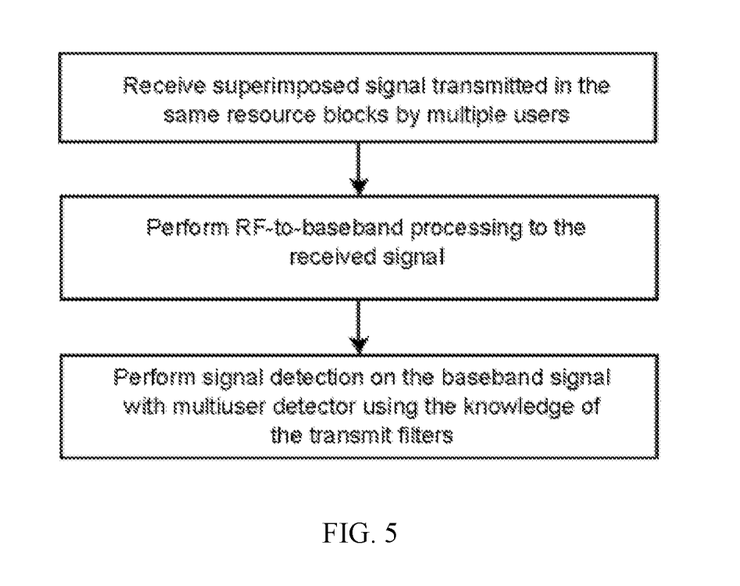
FIG. 5 shows the flow-chart of the operations performed at the receiver side of each user.

The flow-chart of the operations performed at the receiver side of each user is given in FIG. 5. In fifth step of the present disclosure, the superimposed signal of M users transmitted through M uplink radio channels are received under imperfect received power control. Herein, the transmitted signals are generated at the transmitter of each user as described in the present disclosure. Signal of all users are transmitted in the same resource blocks.

In sixth step of the present disclosure, RF-to-baseband processing is performed onto the received superimposed signal. In one example, this step includes the operations for obtaining the baseband superimposed signal from received RF signal, where the received signal is the superposition of the signal transmitted from multiple transmitters.

In seventh and last step of the present disclosure, the detection of each user data is performed on the baseband signal using a multiuser detector, which employs the knowledge of the user-specific transmit filters. This knowledge might be the perfect user-specific transmit filter information assigned to each user or an estimate of the combined effect of user-specific transmit filters and the physical radio channel of the corresponding users.

In one example, detection of each user data in a multi-user detector comprises the baseband operations for signal reception of a single/multiple transmit antenna uplink transmission using a single-carrier modulation including but not limited to DFT-S-OFDM. In another example, the transmitted signal at each transmitter is processed according to single/multiple transmit antenna uplink transmission using an orthogonal multi-carrier modulation including but not limited to CP-OFDM. In another example, the transmitted signal in each transmitter is baseband-to-RF processed according to single/multiple antenna uplink transmission using a non-orthogonal multi-carrier modulation including but not limited to f-OFDM, FBMC, UFMC.

In another example, detection of each user data in a multi-user detector comprises the baseband operations for signal reception, where the received signal is the superposition of the signal transmitted from multiple transmitters. Herein, the transmitted signal in each transmitter is processed according to the operations for the signal generation for other uplink NOMA processing operations including but not limited to CDMA, SCMA, MUSA, IDMA, PDMA, PC-NOMA.

In an exemplary embodiment, the multi-user detector is a Successive Interference Cancellation (SIC) receiver. An SIC receiver detects user signals sequentially. SIC receiver may determine the processing order of users according to a preset metric. In an exemplary embodiment, metric is the user signal-to-noise ratio (SNR) values. In another example, metric is the user signal-to-noise and interference ratio SINR values.

An SIC receiver detects the signal of first user according to processing order from received superposed signal. An SIC receiver may reconstruct the signal of the first user by performing user signal generation and user-specific filtering described in the transmitter side. Then, SIC receiver may subtract the reconstructed signal from the received superposed signal to obtain the intermediate received signal. In an exemplary embodiment, SIC receiver may choose not to reconstruct the signal of the first user according to a preset rule. An example of such a rule is CRC check performed over the decoded user bits if CRC code is employed.

After signal of first user is processed, an SIC receiver moves to second user in order and detects and decodes signal of second user. SIC receiver may reconstruct the signal of the second user by performing user signal generation and user-specific filtering described in the transmitter side. Then, SIC receiver may subtract the reconstructed signal from the intermediate received signal to obtain the new intermediate received signal. In an exemplary embodiment, SIC receiver may choose not to reconstruct the signal of the second user according to a preset rule. An example rule is CRC check performed over the decoded user bits if CRC code is employed. After signal of second user is processed, SIC receiver moves to third user in order. SIC receiver performs identical operations for M users.

An SIC receiver continues its operation until all user signals are processed for at least one time. An SIC receiver may choose to continue or terminate its operation according to a preset rule after all user signals are processed for at least one time. In an exemplary embodiment, SIC processing terminates when maximum number of iterations is reached. Herein, a single iteration is assumed to be completed after all user signals are processed for exactly one time. Alternatively, if SIC receiver employs CRC check over the decoded user bits to decide to reconstruct the signal of the user, then SIC processing terminates when CRC checks for all users hold.

In one example, the multi-user detector is a Parallel Interference Cancellation (PIC) receiver. A PIC receiver detects user signals in parallel from received superimposed signal. A PIC receiver may reconstruct the signals of the users after they are detected by performing user signal generation and user-specific filtering described in the transmitter side. Then, PIC receiver may subtract the reconstructed signals from the received superimposed signal to obtain the residual received signal. PIC receiver may choose not to reconstruct the signal of the users according to a preset rule. An example rule is CRC check performed over the decoded user bits if CRC code is employed.

After signals of all users are processed, a PIC receiver may continue its iterations. At each parallel processing branch, reconstructed signal of the user of corresponding branch may be added back to residual received signal from previous iteration, and a PIC receiver detects user signals using this signal in parallel. PIC receiver may reconstruct the signals of the users at the second iteration after they are detected by performing user signal generation and user-specific filtering. Then, PIC receiver may subtract the reconstructed signals from the received superposed signal to obtain the residual received signal. PIC receiver may choose not to reconstruct the signal of the users according to a preset rule. An example rule is CRC check performed over the decoded user bits if CRC code is employed.

A PIC receiver may choose to continue or terminate its operation according to a preset rule after all user signals are processed for at least one time. In an exemplary embodiment, PIC processing terminates when maximum number of iterations is reached. Herein, a single iteration is assumed to be completed after all user signals are processed (in parallel) for exactly one time. Alternatively, if PIC receiver employs CRC check over the decoded user bits to decide to reconstruct the signal of the user, then PIC processing terminates when CRC checks for all users hold.

In one example, the multi-user detector contains a channel estimation block. Channel estimation is performed to estimate the physical radio channel that a user transmits it signal through. In an exemplary embodiment, channel estimation may be performed using transmitted pilot symbols that are known by the transmitter and receiver. In another example, a channel estimation may be performed over transmitted modulation symbols in the absence of transmitted pilot symbols that are known by the transmitter and receiver. An example channel estimation method is Minimum-Mean Square Error (MMSE) channel estimation. Another example channel estimation method is Least-Squares (LS) channel estimation.

In one example, the channel estimation block uses the perfect user-specific transmit filter information to estimate the physical radio channel. In another example, the multi-user detector does not have the perfect user-specific transmit filter information assigned to each user. The channel estimation block estimates the combined effect of user-specific transmit filters and the physical radio channel.

In one example, the multi-user detector has the perfect user-specific transmit filter information assigned to each user. The perfect user-specific transmit filter information at the multi-user detector is ensured by following the filter generation procedure. Herein, the filters are selected among a preset generated filter table according to the index information sent from the receiver unit. In one example, the filters in the table are randomly generated according to a preset statistical model. In another example, the filters in the table are optimized filters using a specific performance criterion, including but not limited to minimum-mean square error, block error rate, signal-to-interference noise ratio at the receiver.

In another example, the multi-user detector includes the user-specific transmit filter knowledge in the form of combined effect of user-specific transmit filtering and the physical radio channel at the output of the channel estimator.

In one example, the multi-user detector includes a frequency offset estimation block. Frequency offset estimation is performed to estimate the carrier frequency difference between the transmitter and receiver. In an exemplary embodiment, a frequency offset estimation may be performed using transmitted pilot symbols that are known by the transmitter and receiver. In another example frequency offset estimation may be performed over transmitted modulation symbols in the absence of transmitted pilot symbols that are known by the transmitter and receiver. An example frequency offset estimation method is Maximum Likelihood (ML) frequency offset estimation.

In another example, the multi-user detector includes an equalization block. Equalization is performed on superposed received signal to suppress the interference of other user signals to the user signal of interest. An example equalizer may be a Zero-Forcing (ZF) or a Minimum-Mean Square Error (MMSE). An example filter may be a Matched-Filter (MF).

In one example, the multi-user detector includes signal processing blocks that produce inputs for an error-correction code decoder to decode the information bits of each user in the system from superposed received signal or intermediate received signal using the modulations which are described in the transmitter side.

In one example, the multi-user detector includes the operation of deinterleaving for each user. Herein, the deinterleaving is applied to the inputs for an error-correction code decoder using a preset deinterleaver for each user, which reverse the effects of the interleaver that is selected according to the procedures described in the transmitter side.

In one example, the multi-user detector includes the operation of descrambling for each user. Herein, the descrambling operation is applied to the inputs for an error-correction code decoder using a preset pseudo-random descrambling sequence for each user, which reverse the effects of the scrambler that is selected according to the procedures described in the transmitter side.

In one example, the multi-user detector includes the decoding operation of error-correction coding for each user. Herein, the error-correction decoding is performed using the decoder of the error-correction code for each user, which reverse the encoding operation in the transmitter side.

In one example, the multi-user detector includes the operation of CRC check to the output of the error-correction code decoder for each user by the CRC-generating polynomial that is selected according to the procedures described in the transmitter side.

Figure 6:
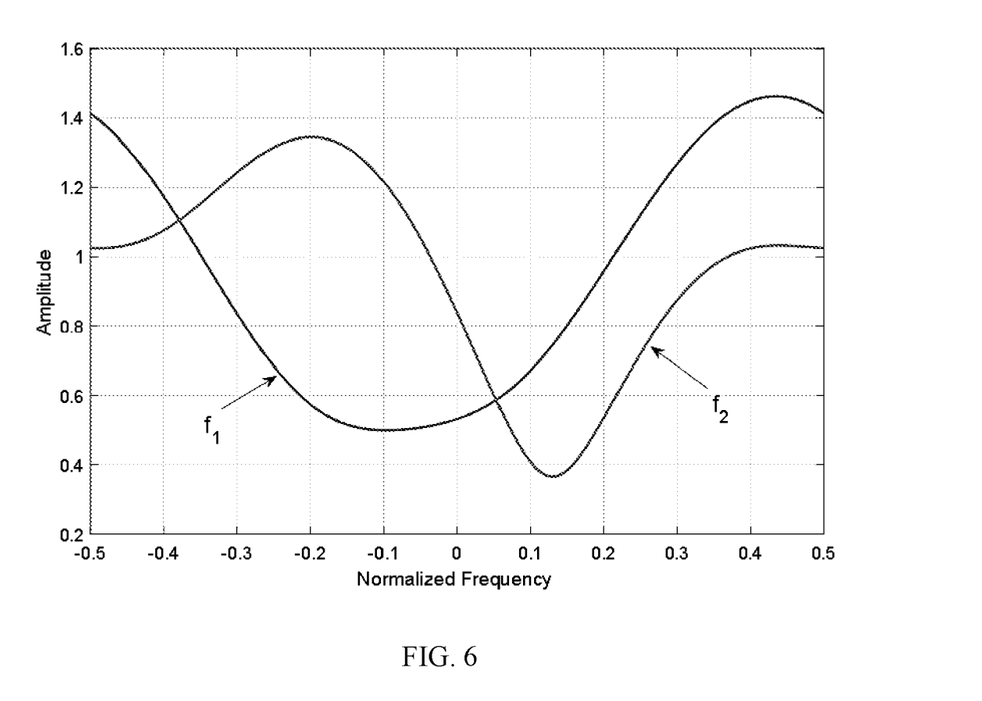
FIG. 6 illustrates the frequency spectrums of exemplary user-specific transmit filters to be used in the disclosed improvement method.

FIG. 6 illustrates the frequency spectrums of exemplary user-specific transmit filters to be used in the disclosed improvement method. The filters are finite impulse response (FIR) digital filters with coefficients:

$f1=[+0.03-0.90j,-0.35+0.16j,-0.18+0.06j]$ $f2=[-0.31-0.11j,+0.73-0.52j,-0.27+0.12j]$

Herein, the filter coefficients are normalized to preserve the total transmit power for each user.

Figure 7:
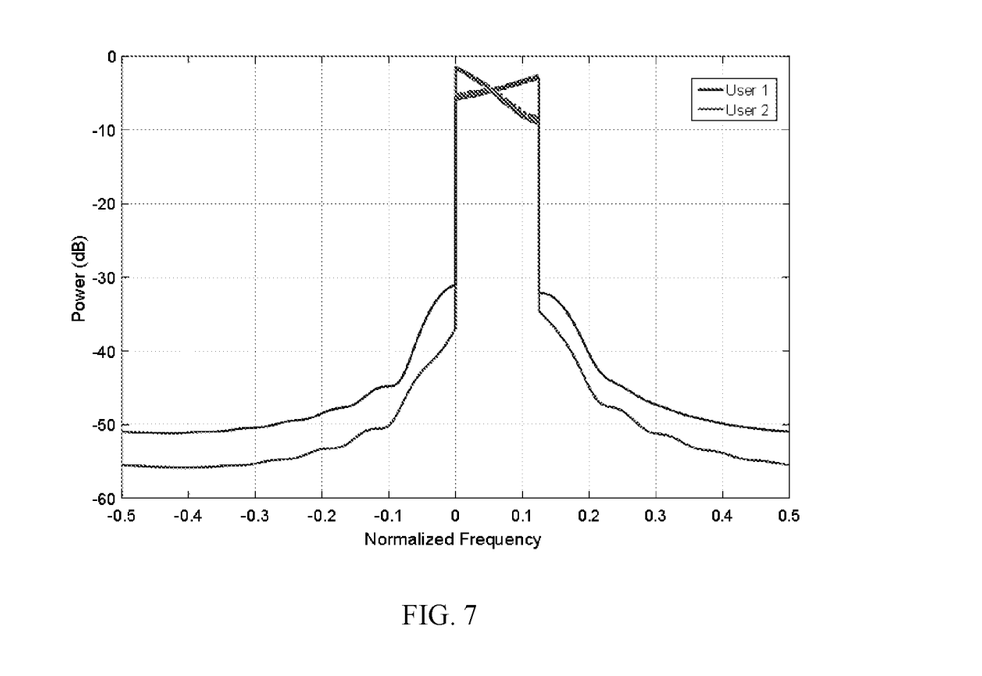
FIG. 7 illustrates the frequency spectrums of multiplexed users with OFDM based waveforms using the exemplary user transmit filters given in FIG. 6.

FIG. 7 illustrates the frequency spectrums of multiplexed users with OFDM based waveforms using the exemplary user transmit filters. Herein, the users are separated in-band part of the spectrum due to the effects of user-specific transmit filters.

Figure 8:
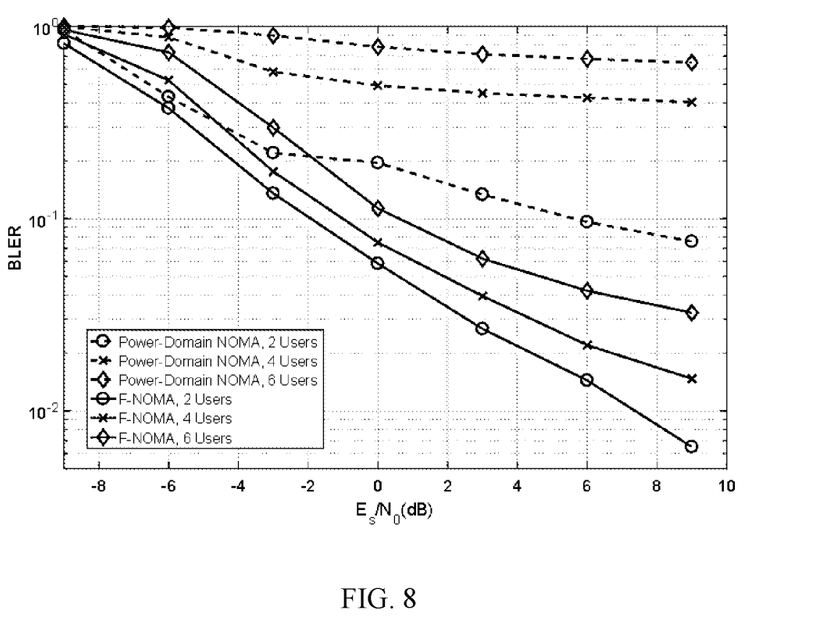
FIG. 8 illustrates a numerical example providing the block error rates (BLERs) of uplink power-domain NOMA and disclosed improvement method, that is referred as Filtered NOMA in the figure for 2, 4, 6 users.

FIG. 8 illustrates a numerical example providing the block error rates (BLERs) of uplink power-domain NOMA and disclosed improvement method, that is referred as Filtered NOMA in the FIG. 2,4,6 users. The signal model used in the simulations is:

$$Y_k = \sum_{i=1}^{M} \sqrt{p_i}\, H_{i,k} F_{i,k} s_{i,k} + n_k$$

where $n_k$ is the additive white Gaussian noise at the receiver, $p_i$ is the transmitted power for the i-th user and $H_{i,k}$ is the combined effect of path loss and fading, $F_{i,k}$ is frequency response of transmitter filtering and $s_{i,k}$ is the transmitted symbol at the k-th subcarrier for the i-th user, respectively. The received power variations of the multiplexing users from the average received power are chosen independently from a uniform distribution between −1 dB and +1 dB. Such a model is adapted to investigate the performance of the schemes in practical scenarios with imperfect received power control or user clustering where the received user powers are not significantly different. The filters have 3 coefficients and generated randomly according to the tapped delay line A (TDL-A) power delay profile model. It is seen from the figure that uplink NOMA cannot operate under the considered imperfect received power control conditions, especially with more than 2 users. On the other hand, the disclosed improvement method, that is Filtered NOMA, can still support more than 2 users even with very short random filters and small differences in the received powers. The results show that disclosed improvement method achieves a significant error performance gain compared to that of power-domain NOMA.

Figure 9:
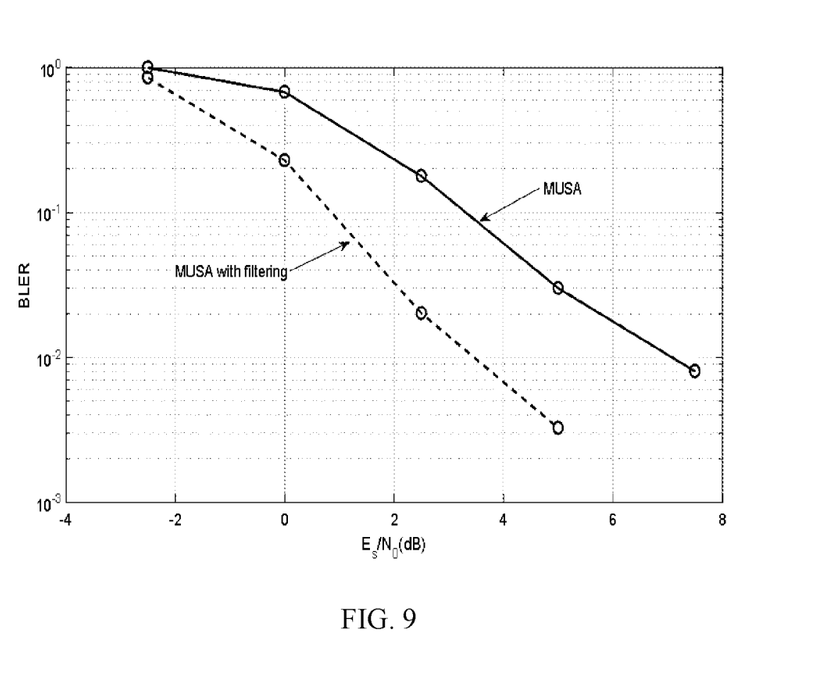
FIG. 9 illustrates a numerical example providing the BLERs of classical MUSA and MUSA with the disclosed improvement method, that is referred as MUSA with filtering in the figure for 8 users.

FIG. 9 illustrates a numerical example providing the block error rates (BLERs) of classical MUSA and MUSA with the disclosed improvement method, that is referred as MUSA with filtering in the figure for 8 users. Herein, the signal model and simulation assumptions are the same as those described for FIG. 8. It is seen from the figure that transmitter filtering can be used together with other user separation methods specific to other NOMA methods such as in MUSA and can still improve their error performance under imperfect received power control conditions, thus improving the ability of the method to support more users.

What is claimed is:

1. A method for improving a performance of an uplink non-orthogonal multiple access method under imperfect received power control based on user specific transmitter filtering comprising the steps of:
generating a signal to be transmitted at a plurality of transmitters of each user according to the uplink non-orthogonal multiple access method,
filtering a generated signal of each user with a user-specific transmitter filter at the plurality of transmitters of each user to improve the performance of the uplink non-orthogonal multiple access method under imperfect received power control,
performing a baseband-to-RF processing to a filtered signal of each user,
transmitting a baseband-to-RF processed signal of each user to a receiver using a same time-frequency resource,
receiving a superimposed signal of each user through a plurality of respective uplink channels under imperfect received power control,
applying a RF-to-baseband conversion onto a received superimposed signal,
performing a signal detection on the received superimposed signal with a multi-user detector using a knowledge of a plurality of transmitter filters of each user;
wherein the user-specific transmitter filter at the plurality of transmitters of each user to improve the performance of the uplink non-orthogonal multiple access method under imperfect received power control are in a digital domain and selected among a preset generated filter table according to an index information sent from the receiver, and the plurality of transmitter filters in the preset generated filter table are randomly generated according to a preset statistical model, or
wherein the user-specific transmitter filter at the plurality of transmitters of each user to improve the performance of the uplink non-orthogonal multiple access method under imperfect received power control are in the digital domain and selected among the preset generated filter table according to the index information sent from the receiver, and the plurality of transmitter filters in the preset generated filter table are a plurality of optimized filters using a specific performance criterion, wherein the specific performance criterion comprises at least one of minimum-mean square error, block error rate, and signal-to-interference noise ratio at the receiver.

2. The method according to claim 1, wherein the user-specific transmitter filter to improve the performance of the uplink non-orthogonal multiple access method under imperfect received power control are in an analog domain.

3. A method for improving a performance of an uplink non-orthogonal multiple access method under imperfect received power control based on user specific transmitter filtering comprising the steps of:
generating a signal to be transmitted at a plurality of transmitters of each user according to the uplink non-orthogonal multiple access method,
filtering a generated signal of each user with a user-specific transmitter filter at the plurality of transmitters of each user to improve the performance of the uplink non-orthogonal multiple access method under imperfect received power control,
performing a baseband-to-RF processing to a filtered signal of each user,
transmitting a baseband-to-RF processed signal of each user to a receiver using a same time-frequency resource,
receiving a superimposed signal of each user through a plurality of respective uplink channels under imperfect received power control,
applying a RF-to-baseband conversion onto a received superimposed signal,
performing a signal detection on the received superimposed signal with a multi-user detector using a knowledge of a plurality of transmitter filters of each user;
wherein the user-specific transmitter filter at the plurality of transmitters of each user to improve the performance of the uplink non-orthogonal multiple access method under imperfect received power control are in a digital domain and selected among a preset generated filter table according to an index information generated using a preset pseudorandom sequence at the transmitter of each user, and the plurality of transmitter filters in the preset generated filter table are randomly generated according to a preset statistical model, or wherein the user-specific transmitter filter at the plurality of transmitters of each user to improve the performance of the uplink non-orthogonal multiple access method under imperfect received power control are in the digital domain and selected among the preset generated filter table according to the index information generated using the preset pseudorandom sequence at the transmitter of each user, and the plurality of transmitter filters in the table are a plurality of optimized filters using a specific performance criterion, wherein the specific performance criterion comprises at least one of minimum-mean square error, block error rate, and signal-to-interference noise ratio at the receiver.

4. A method for improving a performance of an uplink non-orthogonal multiple access method under imperfect received power control based on user specific transmitter filtering comprising the steps of:

generating a signal to be transmitted at a plurality of transmitters of each user according to the uplink non-orthogonal multiple access method, filtering a generated signal of each user with a user-specific transmitter filter at the plurality of transmitters of each user to improve the performance of the uplink non-orthogonal multiple access method under imperfect received power control, performing a baseband-to-RF processing to a filtered signal of each user, transmitting a baseband-to-RF processed signal of each user to a receiver using a same time-frequency resource, receiving a superimposed signal of each user through a plurality of respective uplink channels under imperfect received power control, applying a RF-to-baseband conversion onto a received superimposed signal, performing a signal detection on the received superimposed signal with a multi-user detector using a knowledge of a plurality of transmitter filters of each user;

wherein the user-specific transmitter filter at the plurality of transmitters of each user to improve the performance of the uplink non-orthogonal multiple access method under imperfect received power control are in a digital domain and randomly generated according to a preset statistical model at a time of transmission.

* * * * *